United States Patent
Maurice

(10) Patent No.: US 10,023,368 B2
(45) Date of Patent: Jul. 17, 2018

(54) TUBE HEAD COMPRISING AN INSERT FORMING A BARRIER AND ALLOWING THE INSERT TO BE CENTERED

(71) Applicant: ALBEA SERVICES, Gennevilliers (FR)

(72) Inventor: Thierry Maurice, Chalons en Champagne (FR)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 14/424,242

(22) PCT Filed: Jul. 29, 2013

(86) PCT No.: PCT/EP2013/065889
§ 371 (c)(1),
(2) Date: Feb. 26, 2015

(87) PCT Pub. No.: WO2014/032880
PCT Pub. Date: Mar. 6, 2014

(65) Prior Publication Data
US 2015/0225144 A1    Aug. 13, 2015

(30) Foreign Application Priority Data

Aug. 28, 2012 (FR) ..................... 12 58053

(51) Int. Cl.
*B65D 35/10*    (2006.01)
*B65D 35/12*    (2006.01)
(Continued)

(52) U.S. Cl.
CPC ...... *B65D 51/005* (2013.01); *B29C 45/14073* (2013.01); *B29C 45/14336* (2013.01);
(Continued)

(58) Field of Classification Search
CPC ........ B65D 35/10; B65D 35/12; B65D 35/14; B65D 35/242
See application file for complete search history.

(56) References Cited

U.S. PATENT DOCUMENTS 3,295,725 A    1/1967  Brandt
4,568,001 A *  2/1986  Sander .................. B65D 35/12
                                                      156/294
(Continued)

FOREIGN PATENT DOCUMENTS

GB         2098917 A    12/1982

OTHER PUBLICATIONS

International Search Report dated Nov. 4, 2013 (PCT/EP2013/065889); ISA/EP.
Written Opinion dated Nov. 4, 2013 (PCT/EP2013/065889); ISA/EP.

Primary Examiner — Andrew T Kirsch
(74) Attorney, Agent, or Firm — Banner & Witcoff, Ltd.

(57) ABSTRACT

A plastic tube head for a product having a liquid to pasty consistency, comprising: a neck; a shoulder; and an insert forming a barrier having an outer edge which is covered in a continuous manner by an outer support made of plastic material forming the tube head, and an inner hole defining an inner edge. The tube head is characterized in that the inner edge of the insert is covered in a discontinuous manner by the plastic material forming the tube head, such that a portion of the face of the insert which is oriented towards the internal volume inside the tube and adjacent to the inner edge is covered by an inner support.

9 Claims, 8 Drawing Sheets

(51) Int. Cl.
  *B65D 35/14*   (2006.01)
  *B65D 35/24*   (2006.01)
  *B65D 51/00*   (2006.01)
  *B29C 45/26*   (2006.01)
  *B65D 39/00*   (2006.01)
  *B29C 45/14*   (2006.01)
  *B29L 23/20*   (2006.01)

(52) U.S. Cl.
  CPC .......... *B29C 45/2618* (2013.01); *B65D 35/12* (2013.01); *B65D 39/0076* (2013.01); *B29C 45/14065* (2013.01); *B29C 45/14598* (2013.01); *B29L 2023/20* (2013.01); *B65D 2539/008* (2013.01)

(56) References Cited

U.S. PATENT DOCUMENTS

| | | | | |
|---|---|---|---|---|
| 4,664,284 A | * | 5/1987 | Magerle | B29C 70/845 220/613 |
| 5,035,349 A | * | 7/1991 | Donahue | B65D 35/242 222/107 |

\* cited by examiner

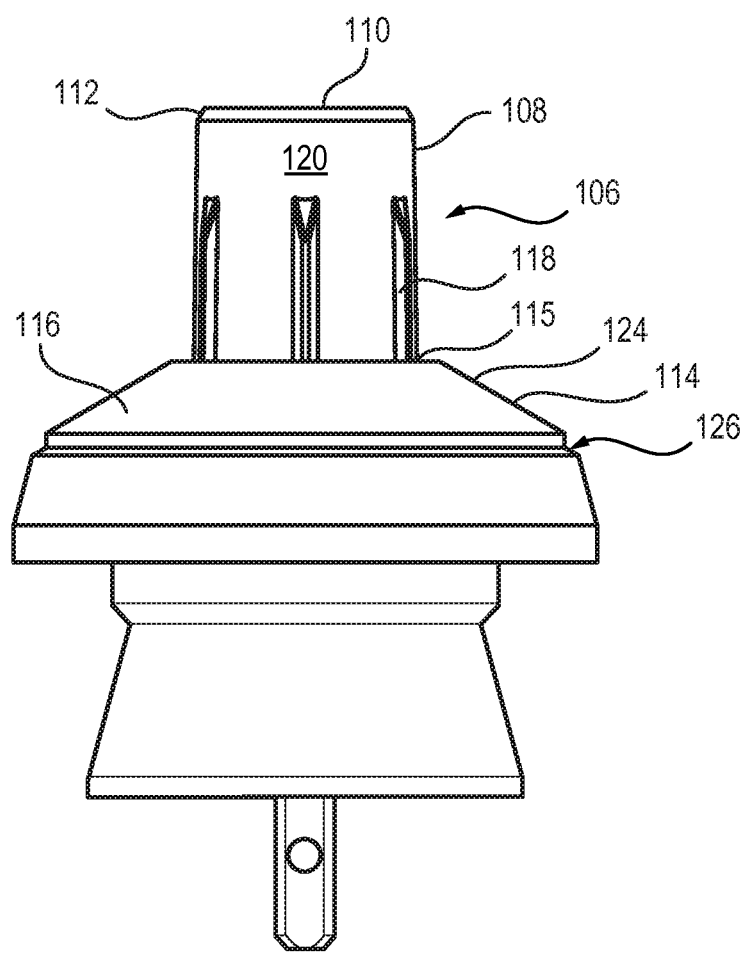

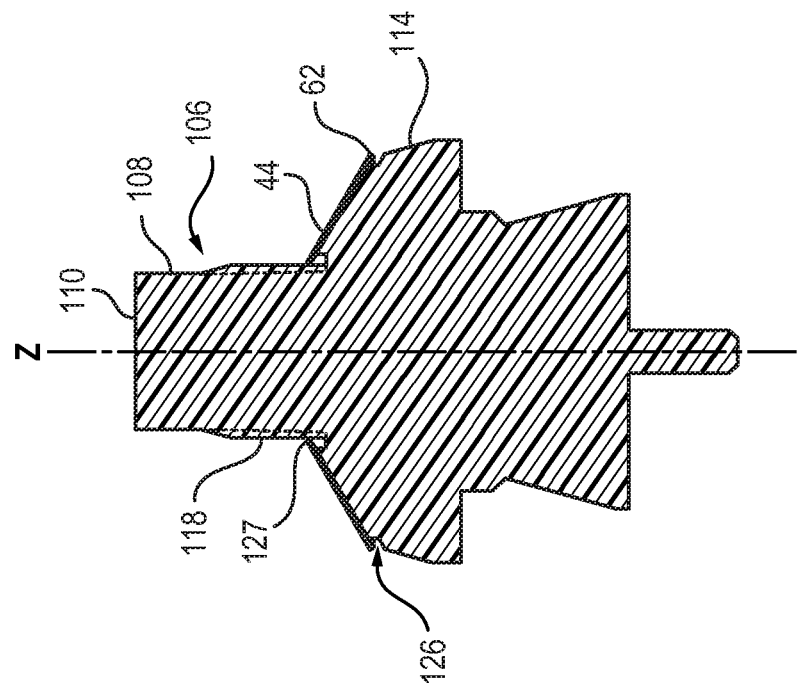
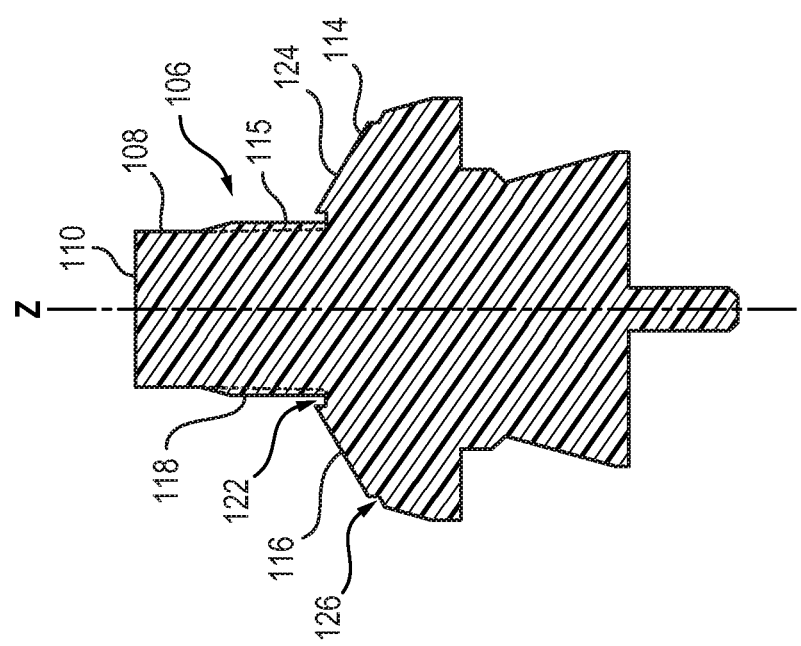

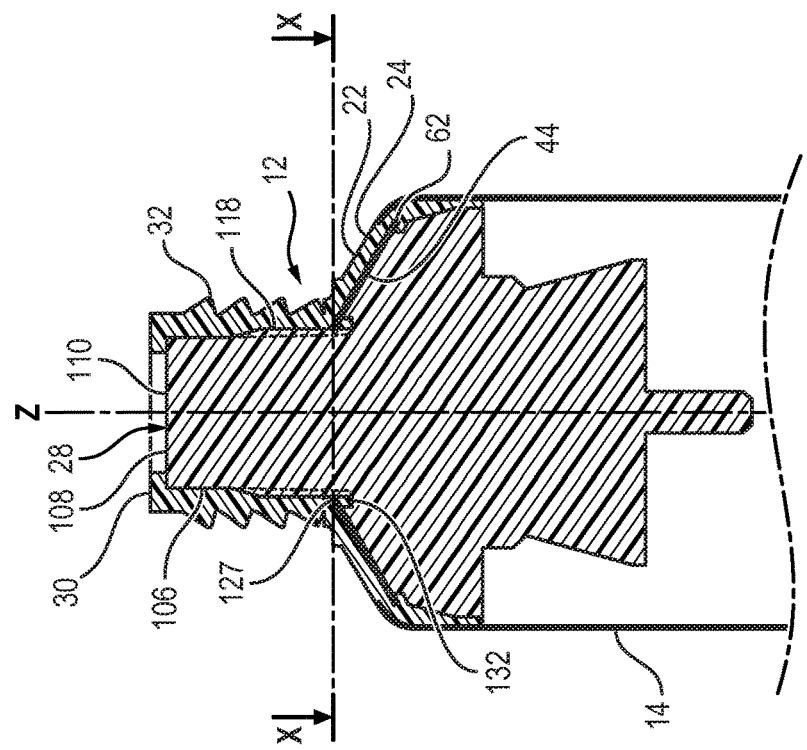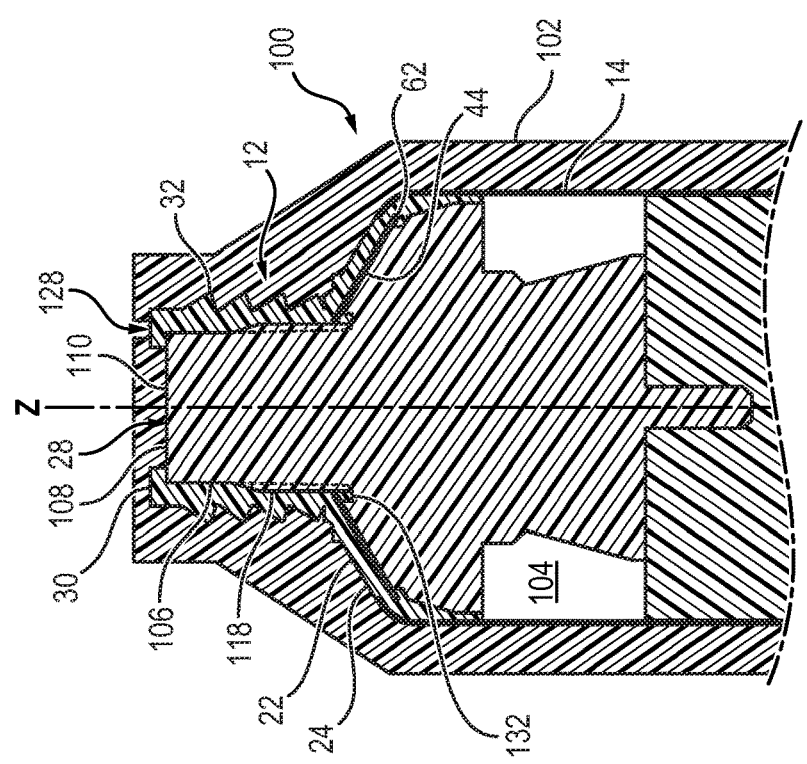

TUBE HEAD COMPRISING AN INSERT FORMING A BARRIER AND ALLOWING THE INSERT TO BE CENTERED

CROSS-REFERENCE TO RELATED APPLICATIONS

The present application is a U.S. National Phase filing of International Application No. PCT/EP2013/065889, filed on Jul. 29, 2013, designating the United States of America and claiming priority to French Patent Application No. 1258053 filed Aug. 28, 2012. The present application claims priority to and the benefit of all the above-identified applications, which are all incorporated by reference herein in their entireties.

GENERAL TECHNICAL FIELD

The present invention relates to tubes for storing and distributing products which are typically in paste, liquid or gel form. It is particularly applicable to cosmetic products.

PRIOR ART

Flexible tubes are very frequently used for distributing liquids, pastes and gels. In many applications, various types of plastics materials are used to manufacture tubes.

A recurring problem with plastics tubes is that they do not make it possible for certain gases and liquids to be prevented from penetrating into the tube, thereby altering the contents of the tube, or, on the contrary, they do not allow certain components of the contents of the tube to be prevented from leaking out, thereby leading to the product itself being degraded. In order to solve this problem, it has been proposed to provide obstacles, in particular in the region of the tube head, to prevent undesirable components from entering and exiting through the tube head.

An insert, which is also known as a washer, is thus conventionally incorporated into the tube head in order to form a protective barrier.

This insert typically comprises a metal layer, which makes it possible to achieve this barrier effect.

However, this solution of adding an insert presents another problem arising from the insert itself. It has in fact been noted that certain products which may be contained in tubes corrode the metal insert, in particular at the edges thereof.

This corrosion may contaminate the contents of the tube, alter the capacity of the tube to protect the product and render it unsightly, and this is problematic in particular in the field of cosmetic products, in which the appearance of the product plays an important role.

Several solutions have been proposed for protecting the insert, and in particular the edges thereof, against the risk of corrosion, for example by folding the edges of the washer over on themselves, but these solutions are not entirely satisfactory either because of their impact on the barrier effect of the insert or because of the associated technical constraints. Furthermore, during injection of the plastics material forming the tube head, the insert is deformed, in particular at the ends thereof, thereby having an impact on the covering and thus possibly leading to inserts which have exposed ends, and therefore meaning that the problem of corrosion of the metal layer of the insert resurfaces.

DESCRIPTION OF THE INVENTION

The present invention aims to propose a tube-head structure which does not have such drawbacks, as well as a mould for manufacturing such a tube head.

For this purpose, the present invention proposes a tube head for a product having a liquid to pasty consistency, said tube head being produced from plastics material and being capable of being connected to a skirt so as to form a tube having an internal volume, and comprising a neck having, at a first end, an opening through which a product is removed from the tube,
a shoulder connected to a second end of the neck opposite the first end,
an insert forming a barrier which is arranged on the inner surface of the shoulder, said insert comprising at least one metal layer and having an outer edge which is covered in a continuous manner by an outer support made of plastics material forming the tube head, and an inner hole defining an inner edge, characterised in that the inner edge of the insert is covered in a discontinuous manner by the plastics material forming the tube head, such that a portion of the face of the insert which is oriented towards the internal volume of the tube and is adjacent to said inner edge is covered by an inner support.

In a variant, said tube head has one or more of the following features, taken in isolation or in combination:

said insert is linear between the inner edge and the outer edge thereof,
the inner hole is aligned with the neck,
the covering of the inner edge (54) of the insert (44) is interrupted by at least one groove,
the covering of the inner edge (54) of the insert (44) is interrupted by at least three grooves, said grooves being uniformly distributed over the neck,
the covering of the inner edge of the insert is interrupted by six grooves in the covering of the inner edge, said grooves being uniformly distributed over the neck,
said insert is in the shape of a truncated cone, which converges from the outer edge towards the inner edge thereof,
said insert comprises at least three superposed layers, these being an upper layer made of plastics material, an inner metal layer, and a lower layer made of plastics material.

The invention also relates to a tube for a product having a liquid to pasty consistency, comprising a tube head according to any of the preceding claims.

The invention also relates to a mould for manufacturing a tube head made of plastics material comprising an insert forming a barrier, said mould comprising:

a mandrel forming a male mould part, said mandrel comprising a substantially cylindrical head for forming the neck, and a shoulder extending from said head,
a female mould part which defines a cavity into which the mandrel is inserted, and an injection channel, said mould being characterised in that
the mandrel is adapted to allow an insert to be positioned on said mandrel such that the injection of plastics material into the mould surrounds said insert in a discontinuous manner and in that a portion of the face of the insert which is oriented towards the shoulder of the mandrel and is adjacent to said inner edge is covered with plastics material during injection.

In a variant, said mould has one or more of the following features, taken in isolation or in combination:

said mandrel comprises at least three centring ribs which extend longitudinally on said head,
said centring ribs are adapted to allow an insert to be positioned on said mandrel such that the injection of plastics material into the mould surrounds said insert in a discontinuous manner, the regions of the insert which are in contact with said ribs not being covered with plastics material, said mandrel comprises a peripheral groove at the joint between the head and the shoulder, said peripheral groove is adapted such that a portion of the face of the insert which is oriented towards the shoulder of the mandrel and is adjacent to said inner edge is covered with plastics material during injection, said shoulder is in the shape of a truncated cone, so as to receive an insert which is in the shape of a truncated cone, and converges from the outer edge towards the inner edge thereof.

DESCRIPTION OF THE DRAWINGS

Other features, aims and advantages of the invention will become clearer from the following description which is given purely by way of illustrative and non-limiting example and should be read with reference to the accompanying drawings, in which:

FIG. 5 is a side view of the tool shown in FIG. 4, FIGS. 6 to 9 are sections of several steps of a method for manufacturing a tube head according to one aspect of the invention.

In all the drawings, identical elements are provided with identical reference numerals.

DETAILED DESCRIPTION

Figure 1:
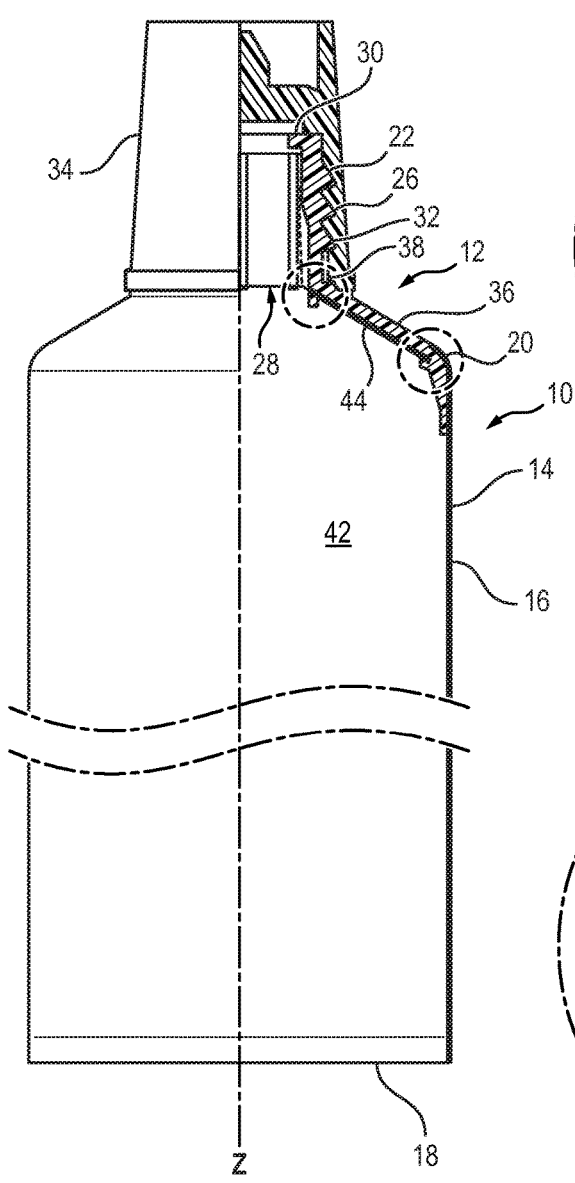
FIG. 1 is a partial section through a tube according to an aspect of the invention.
Figure 2:
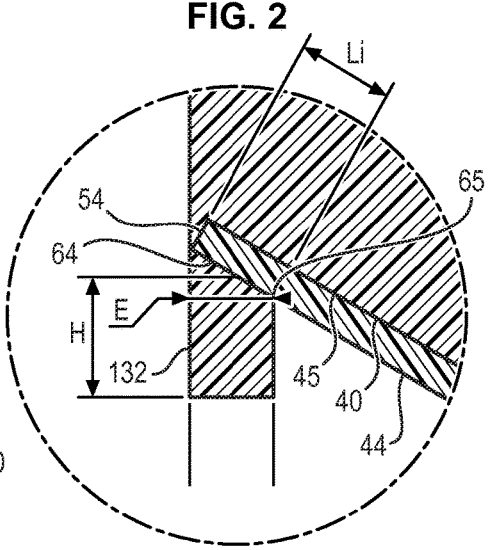
FIGS. 2 and 3 are details of portions of FIG. 1.
Figure 3:
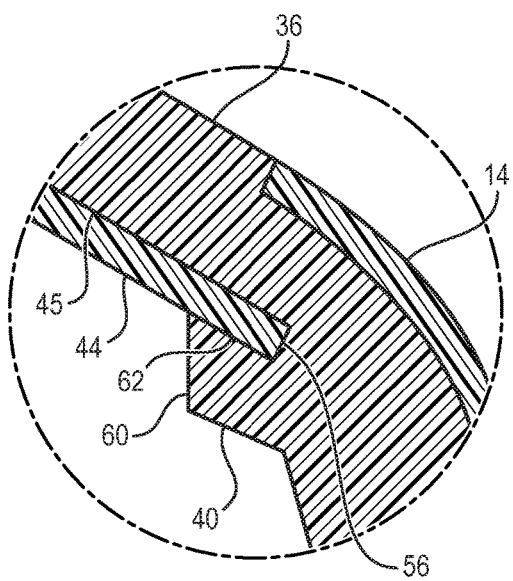

FIG. 1 is a partial section through a tube 10 according to an aspect of the invention; FIGS. 2 and 3 are details of portions of FIG. 1.

The tube 10 comprises a tube head 12 connected to a skirt 14 forming a tubular body 16, which is connected to the head 12 at a first end 20 and closed at a second end 18 opposite the first end 20.

A longitudinal axis of the tube 10 is defined, shown by the axis Z in FIG. 1, and is also shown in the following figures.

The tube head 12 comprises a body 22 made of plastics material having a neck 26 which has an inner passage 28 and opens out at a free end 30.

The neck 26 has an external thread 32 so as to cooperate with a cap 34 comprising a complementary internal thread for closing the tube 10.

A shoulder 36 extends from an end 38 of the neck 26 opposite the free end 30 thereof, the neck 26 and the shoulder 36 being formed in one piece.

The shoulder 36 defines an inner surface 40 which is directed towards the internal volume 42 of the tube 10.

The tube head 12 is connected to the skirt 14, typically by overmoulding the tube head 12 on the skirt 14, or for example by welding or bonding, by mounting the skirt 14 on the previously formed tube head 12, in particular by injection or by compression injection, or by any other method.

The skirt 14 is typically made of plastics material and/or laminated metal, for example a multi-layer assembly comprising one or more layers of metal material such as aluminium, and one or more plastics layers, such compositions being well known to a person skilled in the art.

The tube head 12 further comprises an insert 44, which covers a portion 45 of an inner surface 40 of the shoulder 26.

Figure 13:
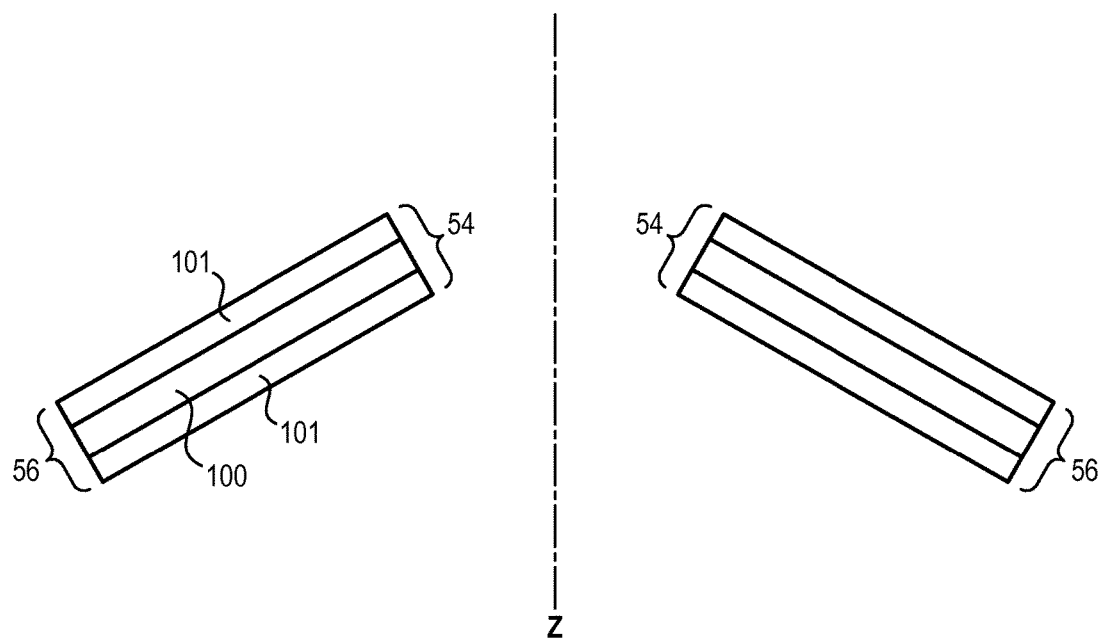
FIG. 13 is a detail of an example of the insert structure.

The insert 44 typically comprises a metal layer 100, for example an aluminium layer, which is arranged between two protective layers 101 made of plastics material which cover the two opposite surfaces of the aluminium layer 100, as shown in FIG. 13.

The insert 44 as shown is a disc which comprises a central opening 50 and is in the shape of a truncated cone. Upper and lower surfaces and an inner edge 54 and an outer edge 56 of the insert 44, between which the insert 44 is substantially linear, are thus defined. As stated above, said inner edge 54 and outer edge 56 are typically points of weakness of the insert, in that the metal layer forming the insert 44 may be accessible at these points, thereby exposing said layer to corrosion by the product contained in the tube 10.

It is understood that the present invention may also apply to an insert 44 which is flat and integrated into a tube head having a substantially planar shoulder.

As shown in the drawings, the outer edge 56 of the insert 44 is surrounded with plastics material which forms the tube head, in particular via a support 60 which covers the outer edge 56 of the insert 44 and a portion 62 of the outer periphery of the face of the insert 44 which is oriented towards the internal volume 42 of the tube 10.

The support 60 thus forms a shoulder in the region of the outer edge 56 of the insert 44, such that the insert 44 is held between the shoulder 36 of the tube head 12 and the outer support 60 over a portion 62 of its length which is adjacent to its outer edge 56.

In the same way, the tube head 12 also comprises an inner support 132 which is similar to the outer support 60 set out above and covers the inner edge 54 of the insert 44 with plastics material, as well as a portion 64 of the face of the insert 44 which is oriented towards the internal volume 42 of the tube 10 and is adjacent to the inner edge 54.

The inner edge 54 of the insert 44 is thus held between the shoulder 36 of the tube head 12 and the inner support 132 over a portion of its length which is adjacent to its inner edge 54. This inner support 132 ensures that the inner edge 54 of the insert 44 is protected against corrosion, which may result from contact with the product contained in the internal volume 42 of the tube 10.

A length Li, which corresponds to the length of the insert 44 which is covered by the inner support 132, and the width E and the thickness H of the inner support 132 are defined. These dimensions are advantageously such that E is greater than or equal to Li, and/or H is greater than or equal to Li, so as to ensure that the inner edge 54 of the insert 44 remains surrounded by the inner support 132 even if the inner edge 54 folds over, for example during injection.

The thickness H is defined as the average thickness of the inner support 132, which is measured from the face of the insert 44 which is oriented towards the internal volume 42 of the tube 10 in a direction which is parallel to the longitudinal direction Z of the tube 10, over the length Li of the face of the insert 44 which is oriented towards the internal volume 42 of the tube 10 and is covered by the inner support 132, prior to possible deformation of the insert 44.

This average thickness of the inner support 132 is thus calculated over the entire length Li of the portion 64 of the inner periphery of the face of the insert which is oriented towards the internal volume 42 of the tube 10 and is covered by the inner support 132, prior to possible deformation of the insert 44.

A joining point 65 is defined at the joint between the insert 44 and the inner support 132, this joining point 65 being the point on the inner face of the insert 44 which is oriented towards the interior 42 of the tube 10 that is the outermost in the radial direction relative to the axis Z which is covered by the inner support 132.

The width E is measured perpendicularly to the axis Z, from the joining point 65 of the inner face of the insert 44 which is oriented towards the interior 42 of the tube 10.

In addition, the inner support 132 is advantageously dimensioned such that the relationship(s) H≥Li and/or E≥Li is/are satisfied even if there are imperfections during cutting or centring of the insert 44.

The thickness H and the width E of the inner support 132 are thus dimensioned so as to take into account significant tolerances during cutting of the insert 44.

The method for manufacturing the tube head 12 as set out above and the positioning of the insert in the tube head 12 are described in detail with reference to FIGS. 4 to 10.

Figure 4:
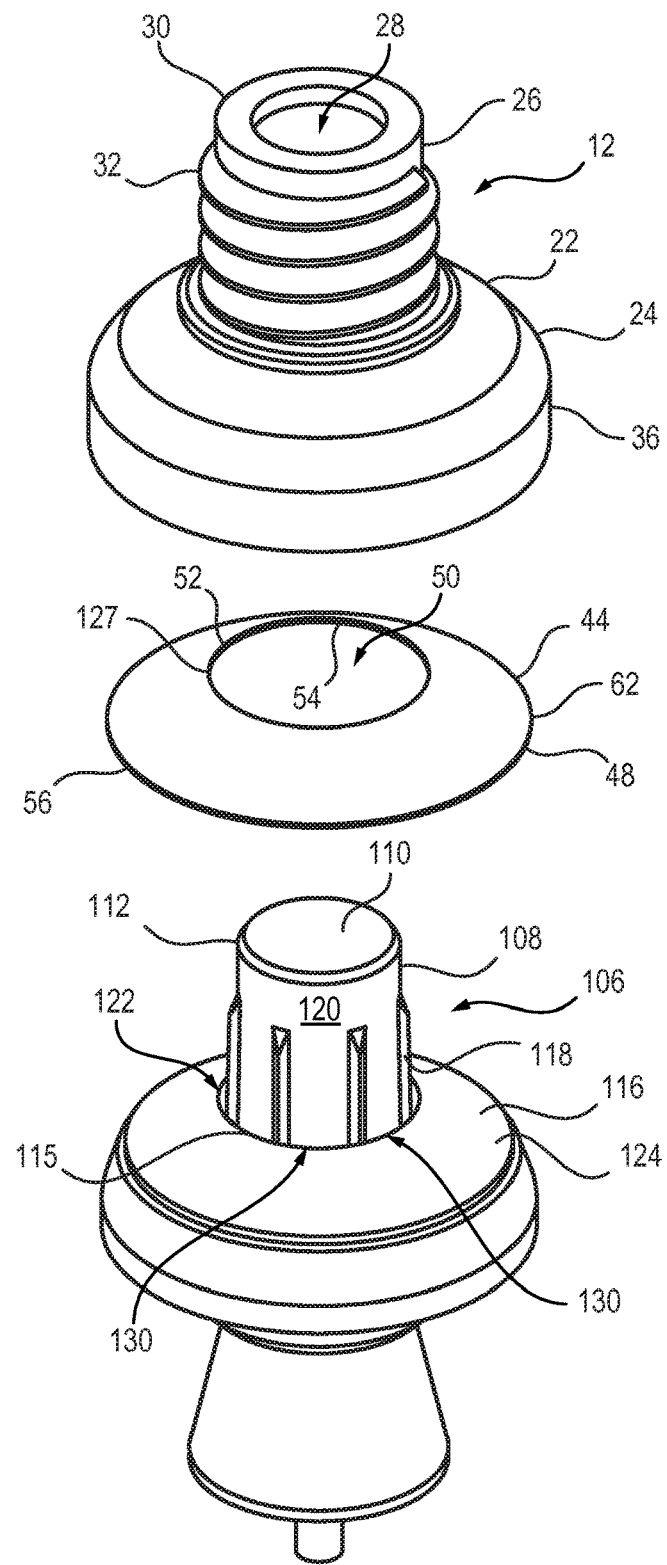
FIG. 4 is an exploded view of the tube head shown in FIG. 1 and of a part of the tool adapted for the manufacture thereof.

FIG. 4 is an exploded view of the tube head 12, the insert 44 and a mandrel 106 (or, more generally, a male tool) of the mould 100 for producing the tube head 12.

The mandrel 106 comprises a substantially cylindrical head portion 108 which is adapted so as to form the inner surface of the neck 26 of the tube head 12, and a substantially frustoconical shoulder 114 which is adapted to form the inner surface of the shoulder 36 of the tube head 12. The head 108 of the mandrel 106 has a free end 110, which is typically provided with a chamfer 112 in order not to have a sharp angle.

As shown in FIGS. 4 and 5, the head 108 of the mandrel 106 comprises volumes forming projections, said volumes being adapted to position the insert 44 when it is arranged on the mandrel 108.

More specifically, the head 108 of the mandrel 106 comprises one or more centring ribs 118 which extend in the longitudinal direction of the head 108, for example three or six ribs which are uniformly distributed over the periphery of the head 108.

The mandrel 106 further comprises a peripheral groove 122 which extends substantially at the base of the head 108 of the mandrel 106, in the region of the joint between the head 108 and the shoulder 114, allowing the base of the neck of the tube head 12 to be formed, and the inner support 132 covering a portion of the face of the insert 44 which is oriented towards the internal volume 42 of the tube 10 and is adjacent to the inner edge 54 of the insert 44.

An example of the use of such a mandrel is shown in FIGS. 6 to 9.

FIG. 6 is a section through a mandrel 106 as described above with reference to FIGS. 4 and 5.

FIG. 7 shows the mandrel 106, on which an insert 44 as described above is arranged.

The insert 44 is supported against the shoulder 114 of the mandrel 106 and is centred around the head 108 of the mandrel 106 via the centring ribs 118 which bear against the inner edge 54 of the insert 44.

FIG. 8 shows the mandrel 106 and the insert 44 combined with a female mould part 102 which defines a cavity into which the mandrel 106 is inserted and an injection channel 128 which is typically arranged so as to be positioned in the region of the free end 30 of the tube head 12.

The mandrel 106 and the female mould part 102 thus define an inner space into which the material forming the tube head 12 is injected.

In the embodiment shown, the skirt 14 is positioned in the mould prior to injection, so as to overmould the tube head 12 on the skirt 14.

As can be seen in the drawings, the injected plastics material partially covers the insert 44, that is to say covers the face thereof that is opposite the internal volume 42 of the tube 10, the inner edge 54 and outer edge 56, and the two positions that are adjacent to these edges and are oriented towards the internal volume 42 of the tube 10.

FIG. 9 shows the tube head 12 thus formed together with the mandrel 106, the female mould part 102 having been removed.

Figure 10:
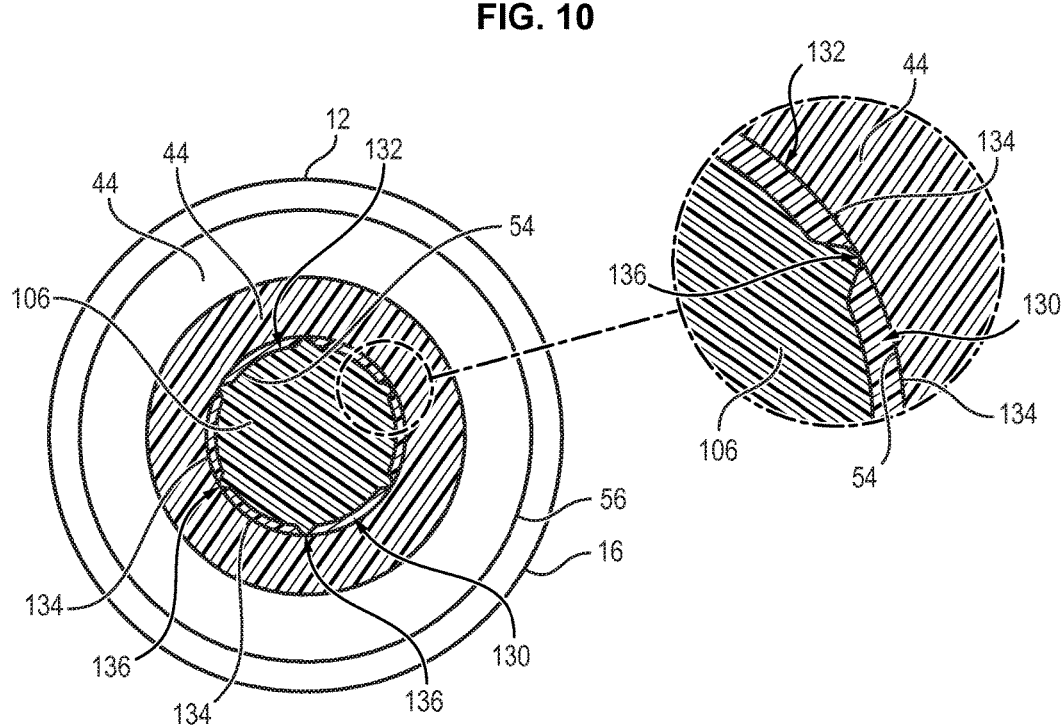
FIG. 10 is a section through the tube head along an axis X-X defined in FIG. 9, FIGS. 11 and 12 are each a section through a portion of the tube head according to an aspect of the invention.

A plane X-X is shown in this figure, which defines the sectional plane of the tube head 12 in FIG. 10.

FIG. 10 is a section along the plane X-X as defined above through the tube head 12, and emphasises the geometry of the neck 26 of the tube head 12 and in particular the positioning of the insert 44.

This figure more particularly shows the effect of the centring ribs 118 of the mandrel 106 on the neck 26 of the tube head 12 and the grooves 136 which result therefrom. These grooves 136 define points in the region of which the insert 44 is directly accessible and is not covered by the material forming the tube head 12. As can be seen from FIG. 10, with the exception of the grooves 136, the inner edge 54 of the insert 44 is covered with plastics material, thus protecting said edge against corrosion.

Since the regions of possible contact between the inner edge 54 of the insert 44 and the product contained in the tube 10 are limited to the grooves, they are therefore greatly reduced, thereby making the risk of corrosion of the insert 44 very low while allowing the insert 44 to be centred on the mould 100 for injection.

In addition, it is understood that owing to the working clearance that results from the manufacturing of different parts (in particular the insert 44) and is necessary to allow the insert 44 to be positioned on the mandrel 106, a thin layer of plastics material may cover the regions of the insert which bear against the ribs 118 of the mandrel 106, such a thin layer of plastics material not forming an effective covering of the insert 44.

Figure 11:
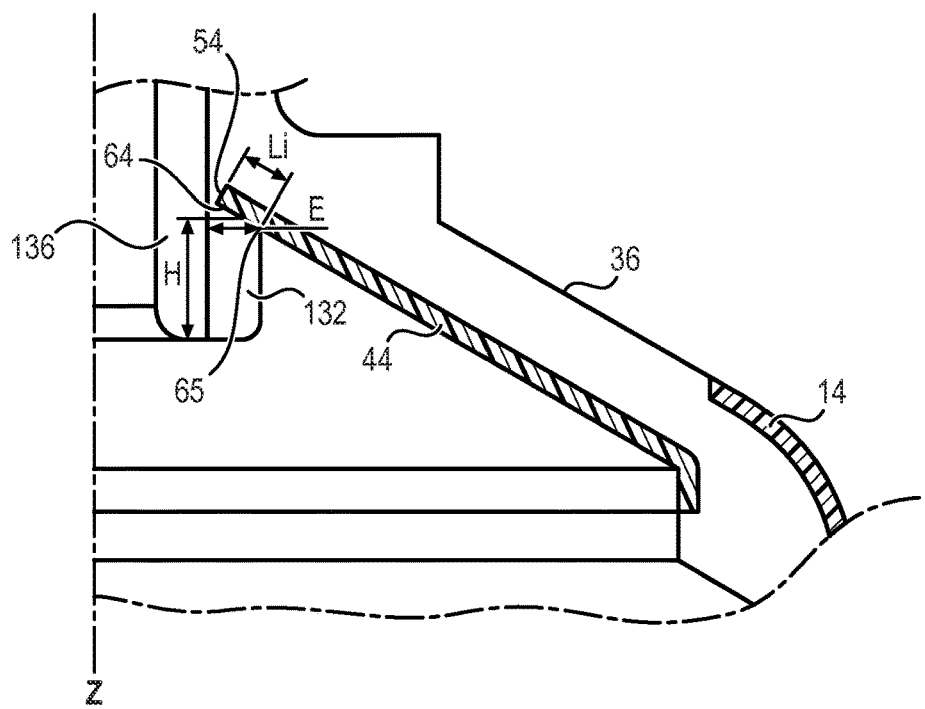
Figure 12:
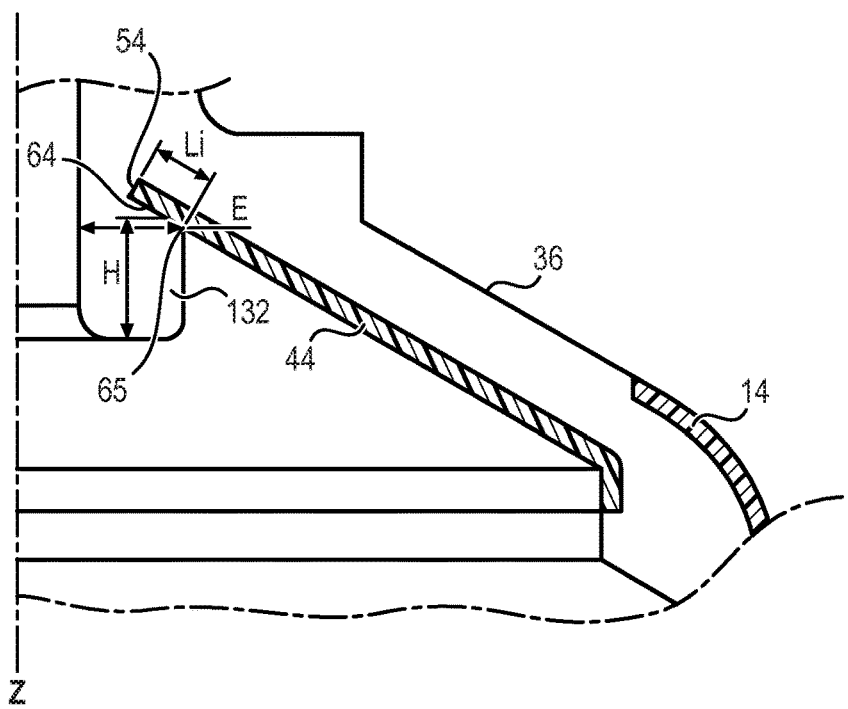

FIGS. 11 and 12 are each a section through a portion of the tube head as set out above, FIG. 11 being a section along a plane passing through a groove 136 which is described above, whereas the sectional plane used for FIG. 12 does not pass through such a groove 136.

The values Li, H and E are shown in these two figures. It can be clearly seen that the thickness E of the inner support 132 is lower In the region of a groove 136, the thickness of the inner support 132 being reduced by the depth of the groove 136.

The relationships H≥Li and/or E≥Li are advantageously satisfied whether in the region of a groove 136 or not, thus ensuring that the inner edge 54 of the insert 44 is protected, even in the region of the grooves 136.

It can of course be seen in these figures that even if the insert 44 bends in the region of its inner edge 54, said edge will remain surrounded by the inner support 132 owing to the above-mentioned relationships between the values H, Li and E.

The invention claimed is:
1. A tube head for a product having a liquid to pasty consistency, said tube head being produced from plastics material and being adapted to be connected to a skirt so as to form a tube having an internal volume, and comprising
- a neck having, at a first end, an opening through which the product is removed from the tube,
- a shoulder connected to a second end of the neck opposite the first end,
- an insert forming a barrier which is arranged on the inner surface of the shoulder, said insert comprising at least one metal layer and having an outer edge which is covered in a continuous manner by a covering comprising an outer support made of plastics material forming the tube head, and an inner hole defining an inner edge, the inner edge defining an inner circumference,
- wherein the inner edge of the insert is covered by the plastics material forming the tube head, the covering having a variable width along the inner circumference of the inner edge, such that a portion of a face of the insert which is oriented towards the internal volume of the tube and is adjacent to said inner edge has a length Li covered by an inner support, wherein said insert is linear along length Li when viewed in vertical cross-section.

2. The tube head according to claim 1, wherein the inner hole is aligned with the neck.

3. The tube head according to claim 1, wherein the width of the covering of the inner edge of the insert is variable due to at least one groove in the covering of the inner edge.

4. The tube head according to claim 1, wherein the covering of the inner edge of the insert is variable due to at least three grooves in the covering of the inner edge, said grooves being uniformly distributed over the neck.

5. The tube head according to claim 1, wherein the covering of the inner edge of the insert is variable due to six grooves in the covering of the inner edge, said grooves being uniformly distributed over the neck.

6. The tube head according to claim 1, wherein said insert is in the shape of a truncated cone, which converges from the outer edge towards the inner edge thereof.

7. The tube head according to claim 1, wherein said insert comprises three superposed layers, these being an upper layer made of plastics material, an inner metal layer, and a lower layer made of plastics material respectively.

8. The tube for a product having a liquid to pasty consistency, comprising a tube head according to claim 1.

9. The tube head according to claim 1 wherein the variable width includes regions of the inner edge having no covering.

* * * * *